June 11, 1957      O. E. BATORI      2,795,299
MOUNTING STRUCTURE SENSITIVE TO THE DIRECTION OF MOVEMENT
OF THE MOUNTED OBJECT, AND CLUTCH INCORPORATED THEREIN
Filed June 20, 1955
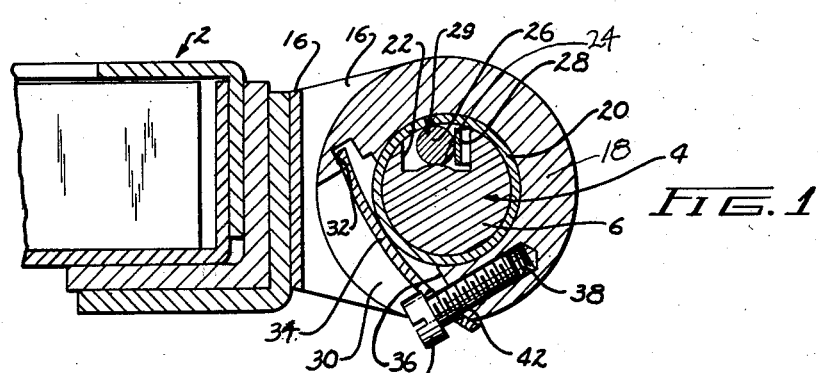
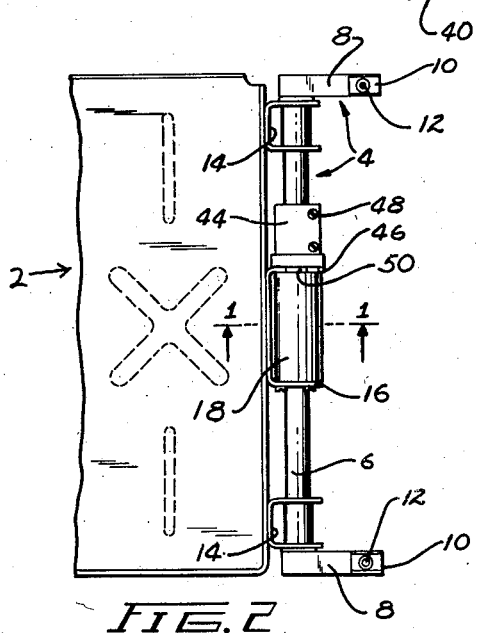
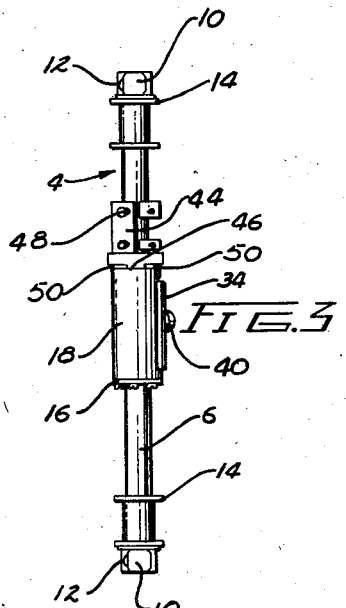
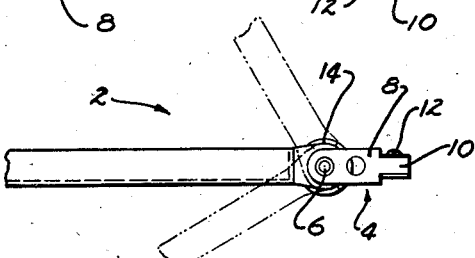
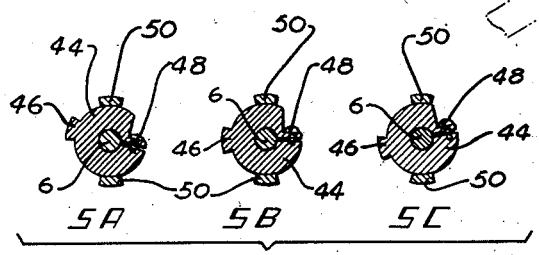
INVENTOR.
OSCAR E. BATORI
BY
ATTORNEY'S

United States Patent Office 2,795,299
Patented June 11, 1957

2,795,299

MOUNTING STRUCTURE SENSITIVE TO THE DIRECTION OF MOVEMENT OF THE MOUNTED OBJECT, AND CLUTCH INCORPORATED THEREIN

Oscar E. Batori, New York, N. Y.

Application June 20, 1955, Serial No. 516,545

2 Claims. (Cl. 188—83)

The present invention relates to a structure for mounting an object so that it will be freely movable in one direction and movable in another direction only upon the application of appreciable force thereto, and to a direction-senstive clutching arrangement incorporated therein.

There are numerous applications in which an object is to be supported in a plurality of positions so as to resist pressure exerted thereon in a given direction, the object also being readily movable to an out of the way position. One such application, in connection with which the present invention is here specifically described, is the mounting of a chart holder or plotting board in, for example, the cockpit of an airplane. It will be understood, however, that the broader aspects of the present invention are in no way limited to this specifically illustrated embodiment.

The pilot of an airplane, particularly a single seater aircraft, must often make reference to maps or charts and may often have to perform navigational or other computations. These are best facilitated by providing a supporting table located in a position accessible to the pilot. The cockpits or pilot's compartments of planes are notoriously crowded with equipment and, particularly in military aircraft, space is at a minimum. Accordingly, the table on which the charts or other papers are mounted must be so constructed as to be movable into operative position, where the charts are displayed or the table surface is presented to be written upon, the table also being readily movable to an out of the way position where it does not interefere with the other functions which the pilot must perform. A special requirement, particularly in jet aircraft of the military type, is that the table, even when in operative position, must not interfere with ejection of the pilot from the aircraft in case of emergency. Since the table, when in operative position, is usually at least partially across the lap of the pilot, it therefore must be very readily movable to its out of the way position to which it is forced when the pilot is ejected. However, the table mounting must be so constructed that when the table is in operative position it will remain in that position even though downward pressure is exerted thereon during the act of writing.

Because different pilots may well be of different sizes and because the optimum position of the table for any given operation may vary from pilot to pilot, it is necessary that such tables be so mounted that they can be positioned in any one of a plurality of positions depending upon the convenience of the pilot and the purpose which the table is to serve at any given moment.

Accordingly, the table must be so mounted as to (1) be movable from an out of the way position, usually raised, to any one of a plurality of operative positions, usually lowered toward and over the lap of the pilot, (2) resist further downward movement therefrom so that the table may be used in desired manner, (3) permit further downward movement therefrom if desired, but only upon the application of appreciable force thereto, and (4) be very readily movable back to its out of the way position.

The present invention discloses a table or other comparable working structure mounted on a support by means of a clutch mechanism specifically designed to attain the above results. The clutch mechanism combines a one-way clutch arrangement and a frictional clutch arrangement. Three clutch elements are involved, to one of which the table is secured. The one-way clutch arrangement is operative between first and second clutch elements and the frictional clutch arrangement is operative between the second and third clutch elements. The one-way clutch arrangement is operative to permit free relative movement of the first and second elements in a direction corresponding to movement of the table toward its out of the way position but to strongly resist relative movement of said first and second elements in the opposite direction toward the operative positions of the table. The frictional engagement between the second and third elements is effectively less than the force by means of which the one-way clutch resists relative movement of the first and second clutch elements in a direction corresponding to movement of the table to an operative position. That frictional froce, however, is sufficiently great so as to resist relative movement between the second and third clutch elements when moderate forces are applied to the table.

Consequently, when the table is moved from its out of the way (raised) position to an operative (lowered) position, the one-way clutch causes the first and second clutch elements to remain relatively stationary or substantially so. However, the third clutch element slips with respect to the second clutch element, thus permitting the table to move when sufficient force is exerted thereon. That force will, of course, be greater than that normally exerted on the table when it is written upon. The table may be moved in the opposite direction to its raised position, however, upon the application thereto of but a minimal force. The one-way clutch will not oppose relative movement of the first and second clutch elements in that direction, such relative movement will readily take place, and the second and third clutch elements will move together by reason of the frictional force which connects them.

In the preferred embodiment of the present invention here specifically illustrated, means are provided for adjustably varying the frictional force in effect between the second and third clutch elements. That frictional force is derived, at least in part, from resilient means operatively active between said second and third clutch elements, the force of that resilient means being adjusted in order to produce the desired results. In addition, an adjustable positive stop mechanism is provided to limit the degree of movement of the table.

To the accomplishment of the above, and to such other objects as may hereinafter appear, the present invention relates to the mounting structure for a table or the like as defined in the appended claims and as described in this specification, taken together with the accompanying drawings, in which:

Fig. 1 is a cross sectional view of the table and mounting structure therefor, taken along the line 1—1 of Fig. 2;

Fig. 2 is a top plan view of a table and mounting structure therefor;

Fig. 3 is a side elevational view of the assembly of Fig. 2;

Fig. 4 is an end elevational view thereof, the table being shown in broken lines in various positions which it may assume; and Figs. 5A, 5B and 5C are idealized cross sectional views showing the manner of operation of the adjustable stop mechanism.

In the form here specifically disclosed the table, generally designated 2, is mounted on a support generally designated 4, that support comprising a rod 6 to the ends of which arms 8 are fixed, those arms 8 being detachably receivable in any appropriate mounting structure by inserting the ends 10 thereof into suitable receptacles in the mounting structure, spring pressed balls 12 being carried by the arm ends 10 so as to detachably retain those ends in the receptacles. The rod 6 of the support 4 will normally be mounted in horizontal position when, as is usual, the table 2 is to be written upon.

Brackets 14 are secured to the table 2 and are freely rotatably received over the rod 6, preferably adjacent the ends of the table 2. Another bracket 16, preferably positioned substantially midway of the length of the side of the table 2, is connected to the table 2 and to a sleeve-like member 18 which surrounds a portion of the support rod 6. An element 20, in the form of a sleeve, is interposed between the member 18 and the support rod 6. As may best be seen from Fig. 1, the support rod 6, where it is covered by the sleeve element 20, is provided with a longitudinal recess 22 opening onto the outer surface of the rod 6 and having a bottom surface provided with a portion 24 which is convex and is more sharply curved than the outer periphery of the rod 6. A rollable element 26 is mounted in the recess 22, and a spring 28, also mounted within the recess 22, urges the rollable element 26 to the left as viewed in Fig. 1. The size of the element 26 in such that when it rides up toward the top of the convex bottom surface 24 it wedges itself between that surface and the inner surface of the sleeve element 20, the spring 28 acting to cause the element 26 to roll up the convex surface 24 into wedging position.

This structure, it will be seen, constitutes a one-way clutch, generally designated 29, between the support rod 6 and the sleeve element 20. When the element 20 rotates with respect to the rod 6 in a counter-clockwise direction as viewed in Fig. 1 the element 26, urged by the spring 28, will ride up the convex surface 24, will wedge itself between the rod 6 and the sleeve element 20, and will substantially prevent any further rotation of the sleeve element 20 relative to the rod 6. However, when the sleeve element 20 is rotated relative to the rod 6 in a clockwise direction as viewed in Fig. 1, the element 26 will roll down the convex surface 24, against the action of the spring 28, and rotation of the sleeve element 20 relative to the rod 6 will be permitted.

A portion of the member 18 is cut away to define an opening 30 all the way therethrough which exposes a portion of the outer surface of the sleeve element 20. One side wall of the space 30 is provided with a notch 32 in which the end of a leaf spring 34 is received, the body of that spring extending over and engaging the exposed outer surface of the sleeve element 20 and the other end of the spring 34 extending over the other side wall 36 of the space 30, that side wall being provided with an internally threaded aperture 38. A headed screw 40 is received within the aperture 38 and passes through an aperture 42 in the end of the spring 34. It will be obvious that the degree to which the screw 40 is threaded into the aperture 38 will determine the force with which the member 18 engages the sleeve element 20, thus controlling the frictional force existing between the member 18 and the sleeve element 20, that force tending to make the parts 18 and 20 move together. The screw 30 is adjusted so that the frictional force between the parts 18 and 20 is less than the force which the one-way clutch 29 exerts on the sleeve element 20 in opposition to rotation thereof in a counter-clockwise direction as viewed in Fig. 1, but is sufficiently great so as to resist relative rotation of the member 18 and sleeve element 20 when downward forces are exerted on the table 2 of a magnitude commensurate with those to be expected when the table is written upon.

In order to positively limit the extent to which the table 2 may be moved, a collar 44 is fixed to the rod 6, that collar carrying a stop lug 46 which extends toward one edge of the member 18. The collar 44 is preferably in the form of a split ring which may be clamped to the rod 6 by means of the screws 48, thus permitting the rotative position of the stop lug 46 to be shifted relative to the rod 6. The member 18 carries a pair of cooperating stop lugs 50, here shown as diametrically opposed and projecting from an end of member 18 toward the collar 44 and into the plane of the stop lug 46. Consequently, as may be seen in Figs. 5A–C (which figures differ from one another solely in the rotative location of the forced stop lug 46 relative to the rod 6) the member 18 may rotate relative to the rod 6 until one or the other of the stop lugs 50 carried thereby engage the fixed stop lug 46. Since the table 2 is rigidly secured to the member 18, this will in turn limit the degree to which the table 2 may be moved. In each of Figs. 5A–C the member 18 is shown in a position corresponding to a horizontal position of the table 2. With the collar 44 set as shown in Fig. 5A, the table 2 may move to an extreme upper position approximately sixty degrees above horizontal and an extreme lower position approximately thirty degrees below horizontal. These extreme positions are shown in the broken lines in Fig. 4. With the collar 44 set as shown in Fig. 5B, the extreme upper and lower positions of the table 2 will be approximately 45 degrees above and below horizontal respectively. With the collar 44 set as shown in Fig. 5C the upper extreme position of the table 2 will be approximately thirty degrees above horizontal and its extreme lower position will be approximately sixty degrees below horizontal. While the specific location of the stop lugs 50 carried by the member 18 as here disclosed permit the member 18 to move rotatively relative to the rod 6 through an angle of approximately ninety degrees, it will be apparent that a different positioning of the lugs 50, or the use of a wider or narrower fixed lug 46, will permit the attainment of any desired limits of movement.

The standby or out of the way position of the table 2 will normally correspond to its extreme upper position. When the table 2 is to be shifted therefrom, for example to a horizontal position where it is to be written upon, it may be grasped and moved. The one-way clutch 22—28 will quickly lock the sleeve element 20 to the support rod 6 and prevent relative rotation therebetween. However, if sufficient force is applied to the table 2 so as to overcome the friction between the member 18 and the sleeve element 20, it may still be pulled down to horizontal position, the member 18 slipping over the sleeve element 20. As previously described, that frictional force will be sufficient to withstand forces exerted upon the table 2 when it is written upon.

It often occurs, particularly in aircraft applications, that when the table 2 is in horizontal position it interferes with observation of the instrument panel or with the performance of various activities attendant upon flying the aircraft. Nevertheless, it may be desired, particularly when a chart is mounted on the table 2, that that chart be visually accessible. In such an event the table 2 may manually be moved down to another operative position below horizontal where its upper surface is still exposed for view. In thus moving the table 2 the mounting parts will cooperate and function in the same manner as described immediately above.

The force which must be exerted on the table 2 to move it down from its raised standby position may well be excessive when the table 2 is to be moved out of the way rapidly in emergencies. This is particularly important when the table 2 extends at least partially across the lap of the pilot and when the pilot wishes to escape from or be ejected from the aircraft. However, the mounting structure of the present invention provides for moving the table 2 to its raised and out of the way position upon the application of but a minimal force thereto. Such movement will cause the member 18 to rotate in a clockwise direction as viewed in Fig. 1, the sleeve element 20 will be frictionally carried around thereby in the same direction, and the one-way clutch 29 will permit ready rotation of the sleeve element 20 over the support rod 6.

Thus the mounting and clutching arrangement of the instant invention is simple and effective for its desired objectives. It is formed of a limited number of parts which cooperate with one another in a simple and reliable manner. Extreme precision of manufacture is not required, since the one-way clutch 29 and the adjustable spring 34 compensate for variations in dimensions over appreciable ranges. Moreover, the strength of the frictional connection between the table 2 (the member 18) and the sleeve element 20 is readily adjustable to compensate for wear as well as to render the structure adaptable to individual differences and preferences. While the invention is particularly suitable for the specifically disclosed use as a movable chart table for an aircraft, it will be apparent that it may be used for many other purposes. Furthermore, many variations may be made in the disclosed structure without departing from the spirit of the invention as defined in the following claims.

I claim:

1. A cltuch comprising a support rod, a sleeve on said rod and rotatable thereover, means active between said rod and said sleeve for permitting relative rotation of one with respect to the other in one direction and strongly resisting relative rotation in the other direction, a member mounted on said sleeve for rotation thereabout, said member having a recess opening onto said sleeve, and a spring carried by said member in said recess and resiliently and frictionally operatively connected to said sleeve to produce a frictional connection between said member and said sleeve which permits slipping of said member on said sleeve only upon the application of appreciable force, the strength of said frictional connection being less than the strength of said means active between said rod and said sleeve in resisting rotation in said other direction, whereby movement of said member relative to said rod in said one direction will be comparatively free, said member and sleeve moving together over said rod, and movement of said member relative to said rod in the other direction will be permitted only upon the application of considerable force thereto, said sleeve remaining substantially stationary relative to said rod and said member slipping with respect to said sleeve.

2. In the clutch of claim 1, means active on said spring to vary the strength of said frictional connection, thereby varying the magnitude of the force necessary to cause said member to move in said other direction.

References Cited in the file of this patent

UNITED STATES PATENTS

| | | |
|---|---|---|
| 1,266,017 | Hill | May 14, 1918 |
| 1,359,399 | Lewis | Nov. 16, 1920 |
| 1,707,505 | Bishop | Apr. 2, 1929 |
| 1,980,857 | Gelette et al. | Nov. 13, 1934 |
| 2,331,210 | Lundbald | Oct. 5, 1943 |
| 2,621,094 | Brown | Dec. 9, 1952 |